United States Patent [19]

Jabara et al.

[11] 4,313,036
[45] Jan. 26, 1982

[54] DISTRIBUTED CBX SYSTEM EMPLOYING PACKET NETWORK

[75] Inventors: Michael D. Jabara, San Francisco; Charles H. Jolissaint, Sunnyvale; David Lieberman, Palo Alto; John D. Edwards, Campbell, all of Calif.

[73] Assignee: Rolm Corporation, Santa Clara, Calif.

[21] Appl. No.: 122,415

[22] Filed: Feb. 19, 1980

[51] Int. Cl.³ .................................................. H04M 7/06
[52] U.S. Cl. ............................. 179/18 AD; 179/18 ES
[58] Field of Search ........ 179/18 AD, 18 ES, 18 EA, 179/18 B, 18 BG; 370/60, 94, 80

[56] References Cited

U.S. PATENT DOCUMENTS

| | | | |
|---|---|---|---|
| 3,790,719 | 2/1974 | Montague et al. | 179/18 AD |
| 3,934,095 | 1/1976 | Matthews et al. | 179/18 ES |
| 4,139,739 | 2/1979 | von Meister et al. | 179/18 B |
| 4,191,860 | 3/1980 | Weber | 179/18 B |

FOREIGN PATENT DOCUMENTS

| | | |
|---|---|---|
| 1297565 | 11/1972 | United Kingdom . |
| 1351717 | 5/1974 | United Kingdom . |
| 2025735 | 1/1980 | United Kingdom . |

OTHER PUBLICATIONS

"A Sophisticated Switched Service" *Bell Labs. Record* pp. 38-52, Feb. 1979, Kate, Lifehus and Skeer.
"CCIS: A Signalling System for the Stored Program Controlled Network", *Bell Labs. Record*, Feb. 1979, pp. 55-59, Ebner and Tomko.
"Just What is EPSCS", *Telephony*, Mar. 21, 1979, pp. 34-37, Howard.

*Primary Examiner*—Gerald L. Brigance
*Attorney, Agent, or Firm*—Blakely, Sokoloff, Taylor & Zafman

[57] ABSTRACT

A distributed CBX system which provides a virtual network between remotely located CBXs is disclosed. The CBXs are connected to both a voice network and a packet network. A first CBX may interrogate a second CBX to determine, by way of example, the status of a called station at the second CBX over the packet network. The second CBX not only provides the status of the called station but also provides, if the called station is clear, the number of a free incoming line at the second CBX. In this manner, the first CBX can place a call to both an available line and station at the second CBX. Alternatively, because of facility availability or tariff structures, the call may be originated over common carrier facilities in the reverse direction originating over common carrier facilities from the called party end.

13 Claims, 5 Drawing Figures

DISTRIBUTED CBX SYSTEM EMPLOYING PACKET NETWORK

BACKGROUND OF THE INVENTION

1. Field of the Invention

The invention relates to the field of telephony networks, particularly those employing separate signalling channels.

2. Prior Art

In many applications there is a need for a distributed, computerized branch exchange (CBX) for facilities which are remotely located from one another. Ideally, a caller at one such facility should be able to directly dial an extension at another facility. This, of course, can most easily be accomplished by having direct or dedicated lines between these facilities. Such lines (including lease lines) are quite expensive and sometimes unreliable. One problem well recognized is the poor utilization of these lines resulting from incomplete calls, for example, the placing of a call to a remotely located busy station. Often, companies are forced to rely upon calls placed over the public voice network, which can be costly without providing adequate service.

Common channel interoffice signalling (CCIS) is used to provide better utilization (faster call setup and alternative routing) of voice links between central office. Signalling and supervisory data are transmitted over a separate data link between the offices as the call voice path is set up. When it is determined from the data link, by way of example, that a voice path can be set up, then a call is established over the voice link. While CCIS may provide increased efficiency between central offices, it does not provide a satisfactory solution or many of the features desirable for interconnecting remotely located CBXs. Tariffs are emerging which make switched common carrier facilities less expensive than dedicated private lines—used in place of an augmentation to private lines.

A CBX typically passes answer end call completion supervision over to a common carrier facility selected at the originating end (SPINT, EXECUNET, WATS, and so forth). The called end typically may be direct-inward-dialing, direct inward system accessed (DISA) or to an attendant. If the called party on a CBX to CBX intra company call is busy the CBX user still has to pay the common carrier for a completed call on either the attendant answered or DISA call. The CBX had to answer the call in these situations to get additional calling information on the called number. Direct-inward-dialing avoids this charge but this feature is not widely offered by different common carrier and those which do offer it charge accordingly. What is needed is a separate answer supervision path between end-point CBX. This patent provides such an invention. In this manner end-to-end answer supervision can be maintained in case of call blockage within the common carriers. Translation of common carrier dialing information (e.g. a specific incoming trunk at the called (CBX) can be associated with a desired extension at that CBX by information exchanged between CBX during initial call setup via the data path. Alternatively, resource availability at the two CBXs can be combined to achieve economies of scale. For example, the called CBX may have less expensive facilities available such as outwats trunks. In this case, the call would be reversed by the CBX to CBX interaction on a data link and the called CBX could originate the voice links to the voice switched common carriers. Capabilities such as those described will be increasingly important to the CBX end user as the proliferation of common carriers with a variety of tariff facilities of various service qualities as regards blockage continues. It is impractical, if not impossible, to provide a dedicated data link or switched data links between remotely located CBXs as can be done between central offices. (As the number of connected CBXs increases, the number of data links needed to fully interconnect them increases at a rapid rate. For example, 10 CBXs would require 45 links, assuming only direct links between CBXs are used). Moreover, while efficient utilization of a dedicated data link or the equivalent between central offices is possible, only poor utilization can be expected from a data link interconnecting remotely located CBXs. For a general discussion of CCIS and its use for a callback feature see: "CCIS: Signalling the Future of Stored Program Control", *Telephony*, May 7, 1979; and U.S. Pat. No. 4,166,929.

The present invention provides a solution to the long standing need for an efficient interconnecting system between remotely located CBXs. A "virtual network" is provided by taking advantage of the relatively low cost and high efficiency of the "virtual circuits" for transmitting data provided by the value-added networks or packet networks currently available throughout much of the United States and other parts of the world. These packet networks are used for transmitting control signals and the like between the CBXs; voice links are established over the voice Public Switched network (PSN) or comparable voice networks. ("Virtual networks" as used in this application means at least one virtual circuit used in conjunction with another network such as the voice Public Switched network.)

Numerous advantages of the invented system are described in the specification. Among the advantages is that the system is exceptionally suitable for dialing with multiple (voice) carriers. Since the system permits end point answer supervision, it allows unsuccessful calls to be retried using different carriers. Incoming calls are directly routed (without an operator) to the called station. Thus, the described system provides a distributed CBX with automatic station-to-station capability.

SUMMARY OF THE INVENTION

A distributed CBX system for providing a virtual network between remotely located CBXs is described. The system includes at least a first and a second CBX which may be remotely located from one another. These CBXs are coupled to one or more Voice Public Switched networks in an ordinary manner so that calls may be established between these units. The first CBX includes recognition means for recognizing the number of a called station associated with the second CBX. Data means included within the first CBX prepares a first digital packetized message representative of the number of the called station. The first CBX is interconnected with a packet network so that the packetized message from the first CBX is communicated to the network. The second CBX is also connected to the packet network so that the message from the first CBX is communicated to the second CBX. The second CBX includes status determining means for receiving the packetized message and for determining the status of the called station. Data means within the second CBX prepares a reply message representative of the status of the called station which is communicated to the first CBX over the packet network. In this manner, the first CBX places a call over the voice network only if the called station is clear. Numerous other features such as automatic callback can also be readily implemented.

DETAILED DESCRIPTION OF THE INVENTION

A distributed CBX system employing layered architecture for providing a virtual network between remotely located CBXs is described. In the following description numerous specific details are set forth to provide a thorough understanding of the present invention. It will be obvious to one skilled in the art that the present invention may be practiced without these specific details. In other instances, well-known circuits and circuit techniques are shown in block diagram form in order not to obscure the present invention in unnecessary detail.

The present invention makes use of packet networks (sometimes referred to as packet-switching networks or value added networks) and in particular a public packet network. These networks provide an efficient means for communicating data in discrete packets or messages at relatively low cost and with high reliability. A general discussion of these networks is contained in "LSI: Ready to make a Mark on Packet-Switching Networks", *Electronics*, Dec. 20, 1979, page 89; "LSI: Circuit Simplifies Packet-Network Connection", *Electronics*, Dec. 20, 1979, page 95; and "Development of Packet-Switching Networks Worldwide", *Telecommunications*, October 1976, page 29. Numerous technical aspects of packet-networks and packet communications are described in U.S. Pat. Nos. 4,156,789; 4,032,899; 4,058,672; 3,979,733 and 3,749,845.

Figure 1:
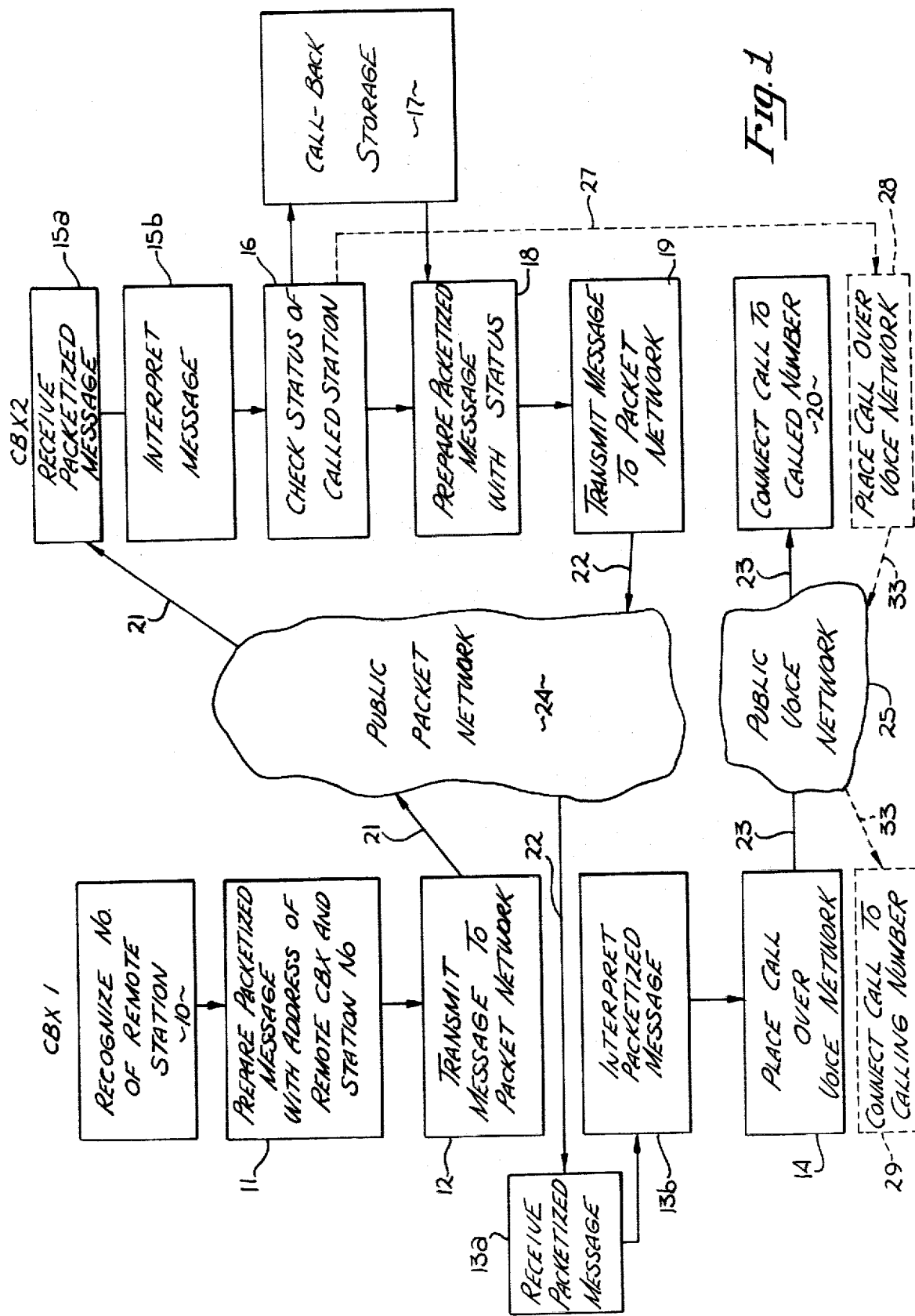
FIG. 1 is a flow diagram illustrating the various steps which occur for the completion of a call with the present invention.

Referring to FIG. 1, the interaction between two remotely located CBXs is demonstrated in a flow diagram format. The functions performed by CBX 1 are shown in a first column of blocks with the functions performed by CBX 2 shown in a second column of blocks. Beginning with block 10, assume that a call is placed from a station connected to CBX 1 to a station associated with CBX 2. CBX 1 recognizes the number of this remote station. Next, CBX 1 prepares a packetized message which includes the packet network address of CBX 2 and the station number (extension number) of the called station associated at CBX 2 (Block 11). This packetized message, as shown by block 12, is transmitted to a public packet network 24 via line 21.

The packetized message is received by the CBX 2 from the public packet network (block 14a) and is interpreted as a message from CBX 1 as indicated by block 15b. CBX 2 checks the status of the called station (block 16) and prepares a packetized message indicating the status of the called station (block 18). In the presently preferred embodiment, this message also includes a designation of an available trunk line at CBX 2, if the called station is not busy. This message is then communicated to CBX 1 again through the public packet network as indicated by block 19 and line 22.

CBX 1 interprets the packetized message from CBX 2 (block 13a) assuming that the called station is clear, interprets the message (blocks 13b) and then CBX 1 places a call to the free trunk at CBX 2 over the public voice network 25 as indicated by block 14 and line 23. As indicated by block 20, CBX 2 automatically completes the connection between the calling station to the called station when the call is received on the free trunk. (The public voice network may include multiple vendor lines or special lines; e.g., WATS, SPRINT, EXECUNET, CITY-CALL etc.)

If the called station is busy, callback information may be stored as indicated by block 17 and the call completed when the station is clear. In this event an acknowledgement is sent to CBX 1.

Alternatively, rather than completing the call from CBX 1 to CBX 2, if the called station associated with CBX 2 is clear, a call may be directly completed from CBX 2 to CBX 1 as indicated by the dotted line 27, block 28, dotted line 33, and block 29.

Once a call is completed, data as well as voice may be transmitted over the voice network.

In the presently preferred embodiment, the CBXs employed comprise a time division multiplexed, computer controlled private branch exchange such as those manufactured by ROLM Corporation of Santa Clara, California. These CBXs are generally described in the "The ROLM VLCBX", *Business Communications Review*, March-April 1979, beginning on page 38. This CBX is also described, along with a queuing feature, which selects between different classes of trunk lines, in co-pending application, Ser. No. 927,185, filed July 24, 1978, entitled "Finite Storage-Time Queue", assigned to the assignee of the present invention now U.S. Pat. No. 4,163,124.

Figure 2:
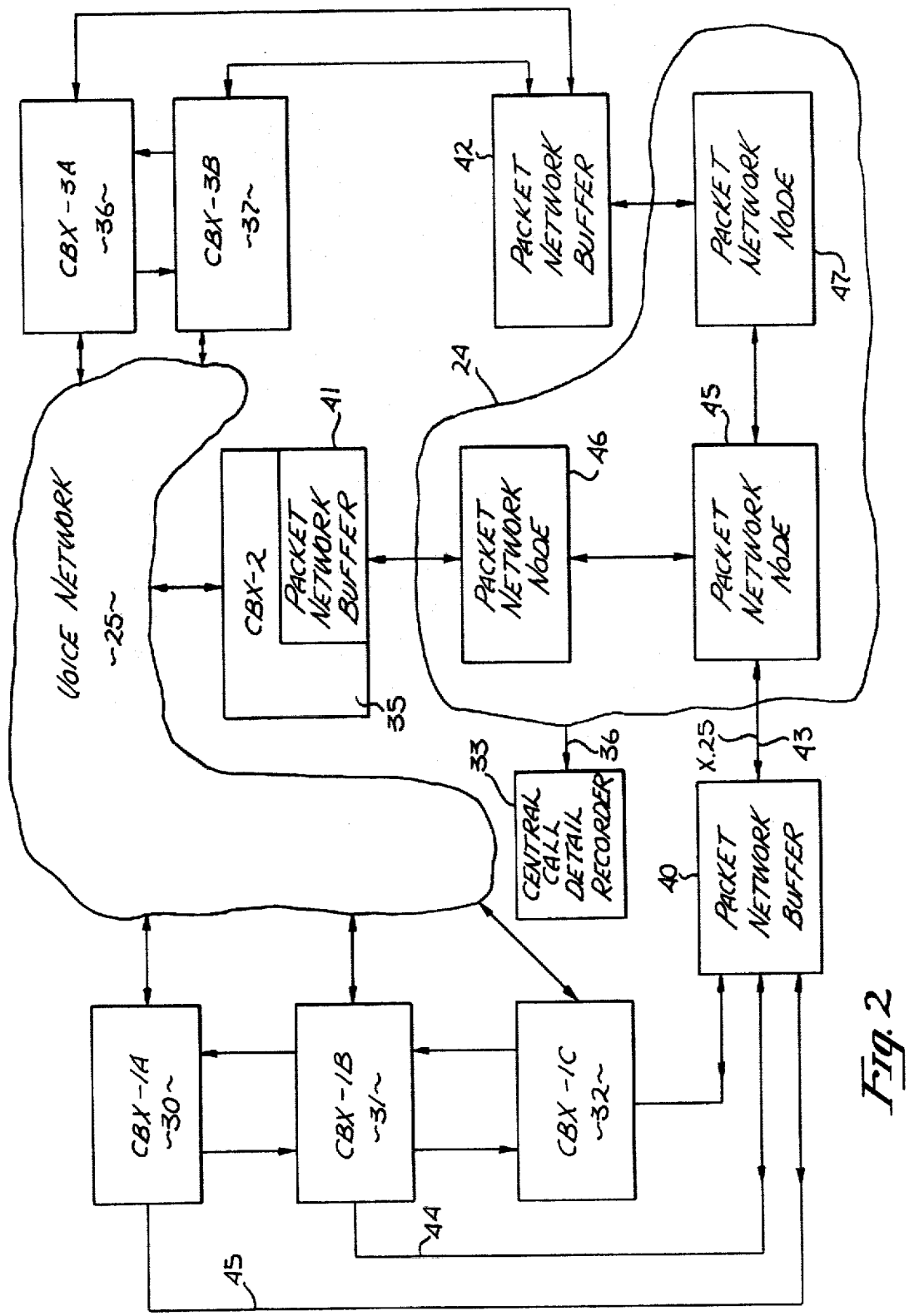
FIG. 2 is a block diagram showing the interconnections of remotely located CBXs with the voice network and packet network.

Referring to FIG. 2, the general interconnections of the CBXs with the packet network and voice network are illustrated. CBXs, 30, 31, and 32 are assumed to be located at one general location, for example, at closely located plants or other facilities. Each of these CBXs are interconnected with one another to permit communications between their associated stations and lines. Also, each of these CBXs are connected to a voice network 25. (A system for interconnecting CBX 1A, 1B, and 1C is described in co-pending application, Ser. No. 54,008, filed July 2, 1979, entitled "Interconnecting Apparatus for a Distributed Switching Telephone System" (assigned to the assignee of the present invention). These CBXs are not directly connected to the public packet network 24, however, all three of the CBXs are connected to a single packet network buffer 40. This buffer permits communications between the CBXs and the packet network 24 over line 43. (Typically, communications with a packet network are in standardized formats set by the Consultative Committee for International Telephony and Telegraph (CCITT) and at this level, the X.25 protocol is commonly used.)

A second CBX 35 which is presumed to be remotely located from CBX 1A-1C, includes its own packet network buffer 41 to permit communications with the node 46 of the packet network. This CBX is also connected to the voice network 25. Two additional CBXs, assumed to be remotely located from CBX 1A-1C and CBX 2, are also coupled to both the voice network and the public packet network. As was the case with CBX 1A-1C CBXs 36 and 37 are connected to node 42 of the packet network through a single buffer 42.

It is significant to note from FIG. 2 that a plurality of relatively closely located CBXs which are interconnected by direct lines, may be connected to the packet network through a single line, such as line 43. This maximizes utilization of the CBX-packet network connection.

Figure 3:
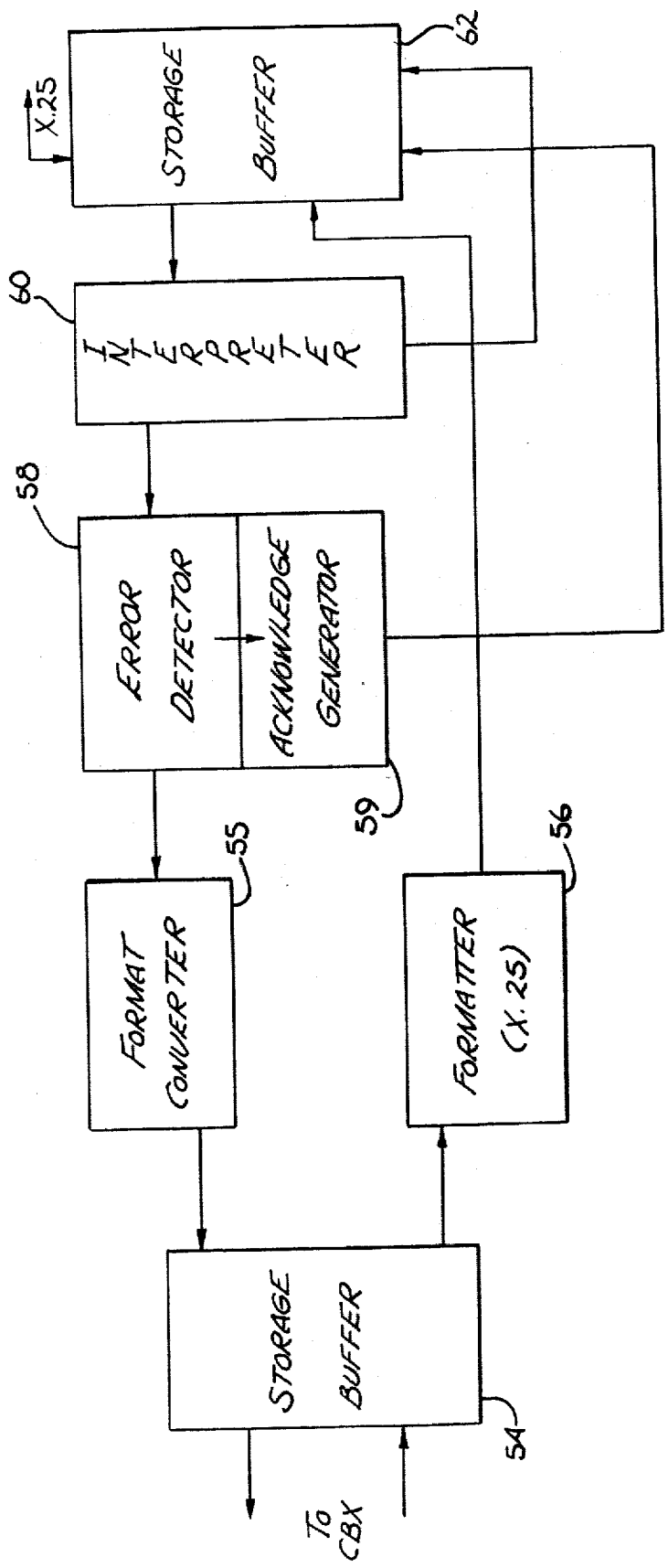
FIG. 3 is a block diagram of a buffer which interconnect the CBX with the packet network.

A buffer for interfacing between a CBX or a plurality of CBXs and the packet network, such as buffer 40 of FIG. 2, is shown in FIG. 3. The digital data from the CBX is coupled to a storage buffer 54. This storage buffer provides temporary storage of data until it is accepted for processing by the buffer (in the case of outgoing data) or until it is accepted by the CBX (in the case of incoming data).

The outgoing data is coupled from the buffer to a formatter 56. This formatter may employ well-known circuitry for formatting the data into the X.25 protocol for transmission to the packet network. As presently preferred, the packet network address of the remotely located CBX is communicated to the storage buffer 54 from the sending CBX, and thus, address information is not provided by formatter 56. Formatter 56 adds the required flags and frame check sequence required by the X.25 protocol. The packetized message from the formatter 56 is communicated to a storage buffer 62. The packetized message is then communicated to a node in the packet network. However, upon sending the message to the packet network node, the message (copy) remains stored in buffer 62.

Incoming data from the packet network is coupled from the buffer 62 into an interpreter 60. The interpreter identifies message types, for example, segregates acknowledgements from true incoming messages. If an acknowledgement is received by the interpreter 60 for a message sent from the buffer 62, then the message (copy) is cleared from buffer 62. Incoming messages are coupled to an error detector 58 and checked for errors in a well-known manner. If no errors are found in the message, an acknowledgement is generated by the generator 59 and coupled through the buffer 62 to the packet network to indicate that the message has been correctly received. Thus, within the buffer of FIG. 3, acknowledgements are received and communicated to verify safe communications between the buffer and the packet network. (These acknowledgements represent a second level of acknowledgements; a first level of acknowledgements occurs from CBX-to-CBX as will be described later.)

The incoming messages from the error detector 58 are coupled to a format converter 55. Within converter 55 the flags, etc., required to transmit the data over the packet network are stripped from the message and then the message is coupled to buffer 54 where it is stored until accepted by the CBX.

Figure 4:
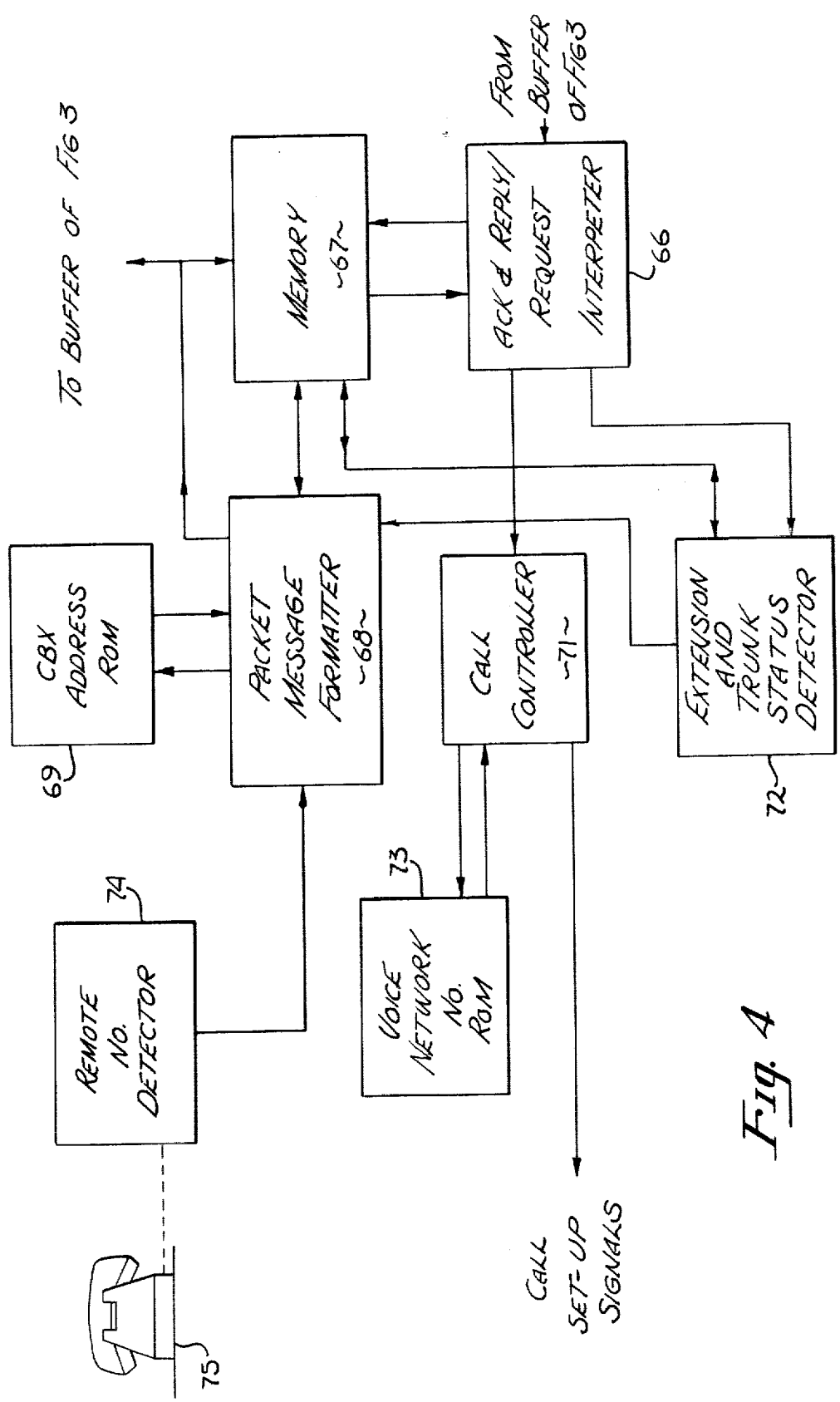
FIG. 4 is a block diagram of a portion of the CBX used to implement the present invention.

In FIG. 4, those portions of the CBX pertinent to the present invention are illustrated. A single station 75 is shown which communicates with a remote number detector 74. If a call is initiated to a station associated with a remotely located CBX, detector 74 detects this condition. When this occurs, the identification of the remotely located (called) extension or station is communicated to a packetized message formatter 68. The formatter 68 prepares a digital message for communications over the packet network except for flags and other formatting provided by the buffer of FIG. 3. The packetized message formatter communicates with a source of packet network addresses, CBX address read-only memory (ROM) 69 for the remote CBX, for example, such as a single digit, is used to address the ROM 69; the ROM then provides the entire packet network address. The formatter 68 also adds an instruction such as "check status" and an identifying code which permits the message to be identified for storage within memory 67 (for purposes of completing the first level of acknowledgement). The output of the formatter 68 is coupled to the buffer of FIG. 3. These messages are also coupled to memory 67 for storage.

The acknowledgement and reply/request interpreter 66 receives incoming messages from the buffer of FIG. 3. Interpreter 66 determines whether the incoming message is an acknowledgement of a message sent to another CBX in which event the acknowledgement may be used to clear a message stored within memory 67. If, for example, the message (reply message) indicates that the status of a called station is clear, this information is communicated to a call controller 71 to permit the initiation of a call from one CBX to another over the voice network. As will be described in conjunction with FIG. 5, a voice network number ROM 73 is employed to allow the look-up of the voice network number of an available trunk line.

In other instances, the message received by the interpreter 66 will request information such as the status of a particular station. An extension and trunk status detector 72 determines the status of a called extension. If the extension is busy, a callback request is entered into memory 67 and periodically the status of the extension is checked. Also, an acknowledgement message is sent by the formatter 68 to the requesting CBX. If on the other hand, the called station is free, detector 72 also identifies an available trunk or pseudo extension and communicates a code indicating both the status of the called station and an identifier for the trunk to formatter 68. The formatter 68 then prepares the appropriate message to the requesting CBX via the buffer of FIG. 3 and the packet network.

(For purposes of explanation it is assumed above that a single free trunk is identified in the reply message. The reply message may identify a hierarchy of incoming lines such as extensions on private lines or multiple vendor lines such WATS, SPRINT, EXECUNET, CITY-CALL, etc. Where a call cannot be completed over one line, the next line in the hierarchy is used, and so on.)

Figure 5:
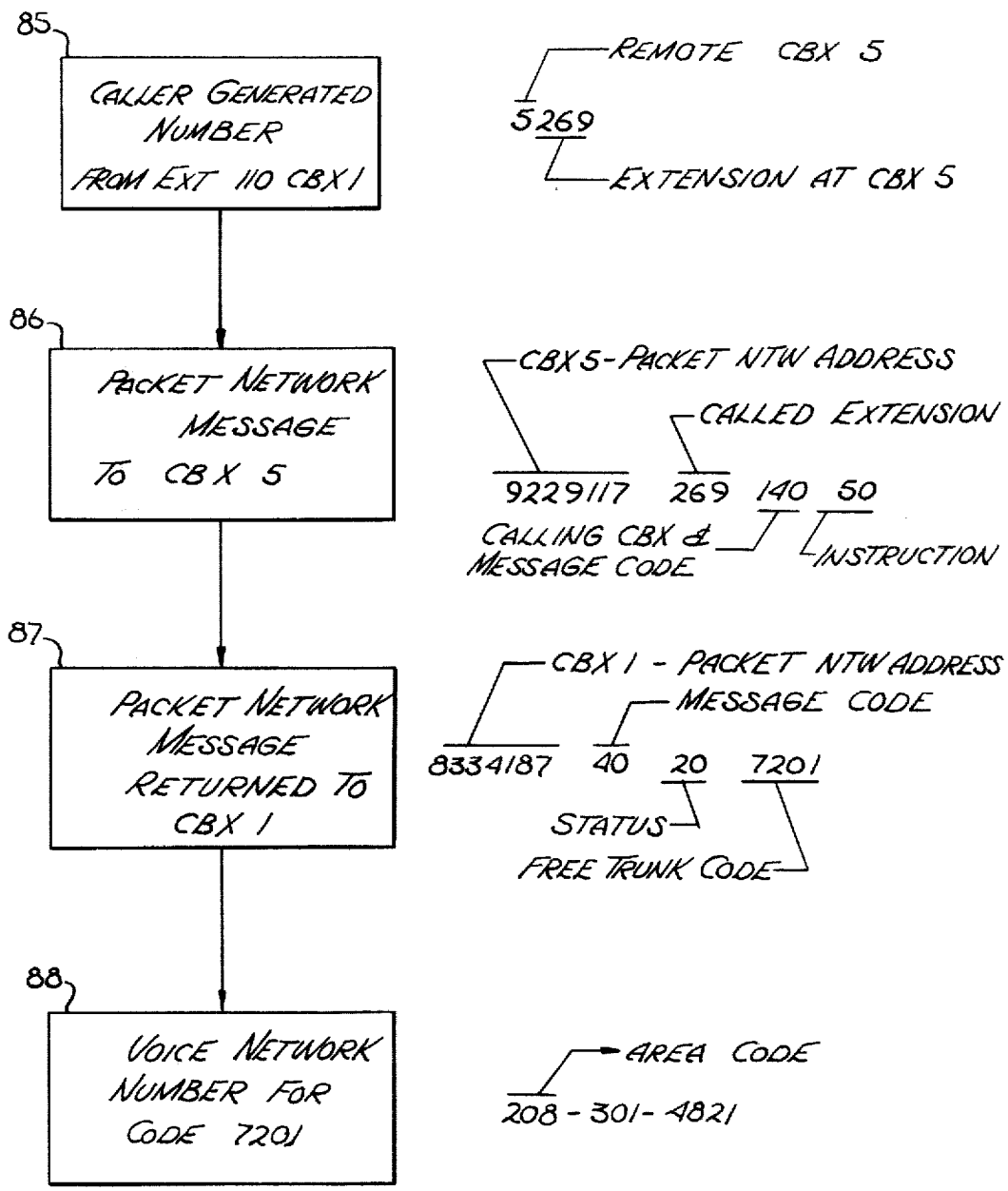
FIG. 5 is a series of blocks and numbers illustrating the various interchanges used in the layered architecture of the present invention.

The operation of the circuit of FIG. 4 is better understood with reference to FIG. 5. Assume that station 75 is extension number 110 and that this station is coupled to CBX 1. Assume further that a call is initiated at station 75 for an extension associated with a remote CBX, and in particular, CBX 5 and extension number 269 associated with CBX 5. For sake of simplicity, assume that detector 74 senses the digit 5 which indicates that the call is intended for the remote CBX 5. This is illustrated in FIG. 5 by block 85 and the numbers shown to the right of this block.

The formatter 68 now generates an appropriate packet network message. The designation 5 of the remote CBX is coupled to the ROM 69 to determine the packet network address for CBX 5. This is shown in FIG. 5 as the number 9229117. The formatter 68 prepares the remainder of the message which includes the called extension number 269, a designation for the calling CBX and a message code, shown as 140 (1 to indicate CBX 1 and 40 to identify a message when stored in memory 67 as will be described). The formatter also includes an instruction to CBX 5 shown as "50" which is interpreted by CBX 5 to mean "check the status" of extension 269. This message is communicated to CBX 5 over the packet network and is also stored in memory 67.

Assume now that CBX 1 has received a return message from CBX 5 which indicates that the status of extension 269 is clear. This is indicated by block 87 in FIG. 5. The first part of the message is the packet network address for CBX 1. (This address is shown for explanation purposes only, it may be stripped from the message within the buffer of FIG. 3 before the message is communicated to interpreter 66 of FIG. 4.) The next part of the message is the message code 40 which corresponds to the code of the message sent to CBX 5. The message code 40 allows the reply message to be correlated with the request message stored within the memory 67. The next two digits, "20" indicate the status, that is, that extension 269 is free. The last four digits, "7201", are a designation for a free trunk at CBX 5. This designation is used to address ROM 73 as indicated by block 88 to provide the voice network number for the available trunk line shown as 208-301-4821. In this manner, when the call controller 71 places a call over the voice network to this trunk, CBX 5 automatically connects this trunk with extension 269 while CBX 1 provides the coupling to the calling station, extension 110. When this occurs, "message 40" stored in memory 67 is erased.

Call supervision may readily be maintained after the call is established as is apparent from the block diagrams. This is useful for call transfer and other features.

Other messages and features for use with the described system will be obvious to one skilled in the art, such as camp-on, call transfer, call forwarding, inward screening, direct inward dialing, reverse billing or call origination and others.

Referring again to FIG. 2, a group of CBXs such as CBX 1A–1C may employ the above described system in a lower level digital/voice network. By way of example, if a call is to be established between CBXs 30 and 31, a packetized digital message formatted generally as described above is sent from CBX 30 to CBX 31 via line 45, buffer 40 and line 44. If the called station is clear, a reply digital message is returned to CBX 30 via line 44, buffer 40 and line 45. Then the call is established between CBXs 30 and 40 through the voice network 25. For this implementation the packetized message from CBX 30 includes a secondary address code which is recognized by buffer40, and buffer 40 couples this message to CBX 31, thus buffer 40 acts as a switching mode for message within a CBX group in addition to directing message to and from the external packet networks.

Also with reference to FIG. 2, a copy of each packetized message (including messages to indicate when a call is terminated) may be sent to a central recorder shown as central call detail recorder 33. This recorder is coupled to the packet network via line 36. This centralized recorder may be readily implemented by having each message repeated for transmission over the packet network with the packet network address of the recorder.

Thus, the described distributed CBX system provides the advantages of the common channel interoffice signalling without requiring dedicate lines between CBXs. (Rather only lines to the packet network are required such as line 43 of FIG. 2). Moreover, the packet network provides very economical communications between the CBXs. It should be noted that the links between the CBX buffers and the packet network nodes such as line 43 of FIG. 2 may be used to communicate other non-signalling data. For example, messages from one CBX to another may be communicated, (including messages for a particular station), or data completely independent of communications, such as inventory data, etc. may be communicated from one facility to another, particularly during low traffic periods.

We claim:

1. A distributed, computerized branch exchange (CBX) system for providing a virtual network between remotely located CBXs, comprising:
   at least a first and a second CBX, said first and second CBX being coupled to a voice network for the establishing of calls between said CBXs;
   said first CBX including recognition means for recognizing the number of a called station associated with said second CBX, requested by a call initiated at said first CBX, and first data means for preparing a first digital packetized message representative of said number of said called station;
   a first line interconnecting said first CBX with a packet network for communicating said first packetized message from said first CBX to said packet network;
   a second line interconnecting said packet network with said second CBX for communicating said first packetized message to said second CBX;
   said second CBX including status determining means for receiving said first packetized message and for determining the status of said called station, and second data means for preparing a second packetized message representative of the status of said called station, said second data means coupled to said second line for communicating said second message to said packet network;
   whereby said first CBX is informed of the status of said called station associated with said second CBX which may be remotely located from said first CBX before initiating a call from said first CBX to said second CBX over said voice network.

2. The CBX system of claim 1 wherein said recognition means of said first CBX interprets the status of said called station from said second message and selectively initiates a call to said second CBX over said voice network.

3. The CBX system defined by claim 2 wherein said second CBX includes recognition means for recognizing the number of a second called station associated with said first CBX and wherein said second data means of said second CBX prepares a digital packetized message representative of the number of said second called station for coupling to said first CBX via said second and first lines and said packet network.

4. The CBX system defined by claim 1 wherein said second CBX includes means for identifying an available voice line into said second CBX and wherein said second message includes signals representative of said identified line.

5. The CBX system defined by claim 4 wherein said first CBX includes means for initiating a call to said second CBX over said trunk line identified in said second message.

6. The CBX system defined by claim 5 wherein said first CBX includes means for coupling said call on said identified line to the calling station.

7. A distributed, computerized branch exchange (CBX) system for providing a virtual network between remotely located CBXs, comprising:

at least a first and a second CBX, said first and second CBX being coupled to a voice network for the establishing of calls between said CBXs;

said first CBX including recognition means for recognizing the number of a called station associated with said second CBX and first data means for preparing a digital packetized message representative of said number of said called station;

a first line interconnecting said first CBX with a packet network for communicating said packetized message from said first CBX to said packet network;

a second line interconnecting said packet network with said second CBX for communicating said packetized message to said second CBX;

said second CBX including status determining means for receiving said packetized message and for determining the status of said called station, said second CBX including means for initiating a call from said second CBX to said first CBX over said voice network in response to said packetized message and said determination of said status of said called station;

whereby said second CBX may initiate a call to said first CBX if the status of the called station associated with said second CBX is clear.

8. A distributed, computerized branch exchange (CBX) system for providing a virtual network between remotely located CBXs, comprising:

a first CBX group comprising a plurality of interconnecting CBXs, said first CBX group being coupled to a voice network;

a second CBX, said second CBX being coupled to said voice network for establishing calls between said second CBX and said first CBX group, said first CBX group including recognition means for recognizing the number of a called station associated with said second CBX, requested by a call initiated at said first CBX group, and first data means for preparing a first digital packetized message representative of said number of said called station;

a buffer coupled to said first CBX group for receiving said first packetized message;

a first line interconnecting said buffer with a packet network for communicating said first packetized message from said packet network;

a second line interconnecting said packet network with said second CBX for communicating said first packetized message with said second CBX;

said second CBX including status determining means for receiving said first packetized message and for determining the status of said called station, and second data means for preparing a second packetized message representative of the status of said called station, said second data means coupled to said second line for communicating said second message to said packet network;

whereby said first CBX group is informed of the status of said called station associated with said second CBX, which may be remotely located from said first CBX group before initiating a call from said first CBX group to said second CBX group over said voice network, and whereby, said first CBX group communicates with said packet network through a single line.

9. The CBX system of claim 8 wherein said recognition means of said first CBX group interprets the status of said called station from said second message and selectively initiating a call to said second CBX over said voice network.

10. The CBX system defined by claim 9 wherein said second CBX includes recognition means for recognizing the number of a second called station associated with said first CBX group, and wherein, said second data means of said second CBX prepares a digital packetized message representative of the number of said second called station for coupling to said first CBX group via said first and second lines and said packet network.

11. The CBX system defined by claim 7 wherein said second CBX includes means for identifying an available voice line into said second CBX and wherein said second message includes signals representative of said identified line.

12. The CBX system defined by claim 10 wherein said first CBX group includes means for initiating a call to said second CBX over said line identified in said second message.

13. The CBX system defined by claim 8 wherein said buffer converts said first packetized message into a predetermined format before coupling said message to said packet network.

* * * * *